United States Patent [19]

Nordell

[11] 4,361,793
[45] Nov. 30, 1982

[54] MOTOR VOLTAGE CONTROLLER DEVICE
[75] Inventor: Daniel E. Nordell, St. Paul, Minn.
[73] Assignee: Sunbird Corporation, Edina, Minn.
[21] Appl. No.: 156,679
[22] Filed: Jun. 5, 1980
[51] Int. Cl.³ .......................... H02P 1/24; H02P 5/28; H02P 7/36
[52] U.S. Cl. .................................. 318/729; 318/778; 318/805; 318/812
[58] Field of Search .................. 361/30; 318/812, 805, 318/729, 798, 809, 810, 811, 778, 345 D, 779

[56] References Cited
U.S. PATENT DOCUMENTS

| | | | |
|---|---|---|---|
| 3,332,008 | 7/1967 | Mueller et al. | 318/809 X |
| 3,441,823 | 4/1969 | Schlabach | 318/809 X |
| 3,443,188 | 5/1969 | Mortimer | 318/345 D |
| 3,573,580 | 4/1971 | Shinozaki | 318/778 |
| 3,742,370 | 6/1973 | Hansen | 318/778 |
| 4,052,648 | 10/1977 | Nola | 318/805 X |
| 4,207,510 | 6/1980 | Woodbury | 318/811 X |

Primary Examiner—Reinhard J. Eisenzopf
Attorney, Agent, or Firm—Steven G. Parmelee

[57] ABSTRACT

A motor voltage control device for single-phase and for three-phase motors, for controlling the voltage supplied to the motor to thereby decrease power when the motor is less than fully loaded. The single-phase device includes a soft start unit and fail detect unit. The three-phase device includes a soft start unit, a fail detect unit, and further provides for controlling motor voltage by allowing modifications to only the positive half cycle of the motor voltage. The three-phase device also continually insures and provides for a path for negative flowing motor currents. The three-phase device also provides for a logic ground for its logic circuitry. The three-phase device may be used with three-phase motors that do not have an easily accessible fourth lead to an internal ground connection.

9 Claims, 5 Drawing Figures

MOTOR VOLTAGE CONTROLLER DEVICE

TECHNICAL FIELD

This invention relates generally to electric motor devices.

BACKGROUND ART

Induction motors are perhaps the most widespread of all electric motors. Such motors require alternating current and may be found in both single phase and three phase power applications. Induction motors generally operate quite efficiently when fully loaded. Unfortunately, this efficiency drops when operating under less than full load conditions. When less than fully loaded, induction motors will consume more power than would otherwise be necessary to sustain operability at the given load.

Because of this, an effort has been made to provide motor voltage control devices that will reduce the amount of unneeded power delivered to induction motors when not fully loaded. These devices operate by monitoring the phase angle between the voltage and current wave forms in the motor, and by then reducing or raising the average voltage delivered to the motor in response to those observations.

U.S. Pat. No. 4,052,648 represents such a device. Briefly summarized, that device senses both the voltage and current flowing through the motor and produces square wave signals proportional thereto. These signals are logically combined and integrated to provide an error voltage signal. This error voltage signal may be influenced by the operator, who seeks to have the device maintain a particular pre-selected phase difference between the motor voltage and current. When the phase difference is other than this pre-selected difference, the device will detect this by comparing the error voltage signal with an internally generated saw-tooth signal and will then alter the delivery of voltage to the motor by controlling a triac in the power line.

By controlling this triac, the motor voltage wave form will be symmetrically chopped; that is, the motor voltage will be turned off for equal periods of time during both the positive and negative cycle of the voltage wave form. Therefore, the average voltage delivered to the motor will be reduced, and the total power consumed by the motor will be less. As the motor load decreases further, the device will turn the motor voltage off for a greater portion of each cycle. By the same token, as the motor load increases, the motor voltage will be turned on more frequently.

Certain problems remain or are created by such a device. In particular, with respect to the use of such a device in a single-phase application, the prior art has taught that motor misstarting may be avoided by delaying the activation of the motor voltage controller unit. In fact, while perhaps preventing the device itself from interfering with starting the motor, this does little to improve normal starting characteristics of the motor. Secondly, the large inrush currents associated with normal motor starting may cause undesirable arcing, light flicker and mechanical stress on the motor and associated equipment.

More seriously, the control device may fail and yet appear to continue to control the motor. The failure mode could include the presence of nonsymmetrical DC voltages in the motor, thereby giving rise to DC currents that could cause failure and even damage to the motor.

While a three-phase version of the device also suffers from the above shortcomings, an even greater problem becomes apparent. Specifically, the prior art teaches that the three-phase device should be restricted to use with three-phase motors having four leads, the fourth lead being connected to an internal ground between the phases. Most three-phase induction motors now in use, however, do not have such an accessible internal ground. To implement the use of such a device, then, would require the operator to dismantle such a motor and install a fourth lead to ground. The disadvantages of this requirement are obvious.

There exists, therefore, a need for a single-phase motor voltage control device having fail detect and soft start protection, and for a three-phase motor voltage control device having fail detect and soft start protection and further being generally usable with three-phase induction motors that do not have an accessible internal ground lead between phases.

DISCLOSURE OF INVENTION

This invention relates to improvements in both a single-phase and three-phase motor voltage control device. Although both devices control the average voltage supplied to the motor by monitoring the phase difference between the motor voltage and current, differences between the single-phase and three-phase device prompt a sensitive description of the two.

With the above considerations in mind, the applicant describes herein a single-phase motor voltage control device that controls the voltage applied to a motor in response to the phase difference between the motor voltage and current. The device will operate to increase or decrease the actual phase difference by increasng or decreasing the average applied voltage via a triac or SCR device until the actual phase difference substantially equals the desired phase difference. The single-phase device also capitalizes upon the operating characteristics of the device to provide for soft starting the motor. Finally, the single-phase device has a fail detect unit to provide for safe contingency operation in the event that the device should fail.

The three-phase motor voltage control device described herein also varies the average voltage applied to each phase in a three-phase motor, in response to the phase difference between the monitored current in one phase and the monitored voltages of each of the three-phases. More particularly, this device may be used with three-phase motors having no accessible internal ground lead, thereby making this device useful with the vast majority of three-phase induction motors. Since the three-phase motor with which this device may be used does not have an internal lead to ground, however, a logic ground must be provided by the device itself to facilitate proper functioning of the device. To accomplish this, resistors are symmetrically wye connected across the supply leads, hereby providing at their common juncture a logic ground quite independent from the power supply ground.

Furthermore, rather than symmetrically chopping the applied voltage to control the average applied voltage, the three-phase device will only alter the motor voltage during the positive half cycle, and not during the negative half cycle. Finally, a diode suitably placed in each power phase line will allow the negative flow of current through the motor at all times, although the positive flow of current will be controlled by a triac or SCR device also located in the power lines.

The importance of these provisions for the three-phase device will become more apparent when it is realized that currents flowing in the positive direction through the triac will always have a path, but with the triac turned off, currents seeking to flow in the reverse direction may not have such a path, since the motor has no fourth lead ground path. The abovenoted improvements solve this problem by insuring that a reverse path will always exist for negative flowing currents.

Without such a path, the device may still operate with a three-phase motor, but control will be quite impossible over certain significant ranges of operation. Of course, substantially full control may be obtained with a three-phase motor voltage controller such as that described earlier by providing the motor with an accessible internal ground lead, but this results in expensive and time consuming alterations to the motor itself. By making the improvements suggested by the applicant, substantially full compensation may be realized and effective control of the motor's power consumption when less than fully loaded will be obtained without the need of an accessible internal ground.

The three-phase device also includes a soft start unit to assist in starting the motor and a fail detect unit to prevent an improperly functioning device from damaging the motor.

BRIEF DESCRIPTION OF DRAWINGS

These and other features of the invention will become more apparent upon reference to the following description of the best mode for carrying out the invention, and in particular upon referring to the drawings, wherein.

BEST MODE FOR CARRYING OUT THE INVENTION

Figure 3:
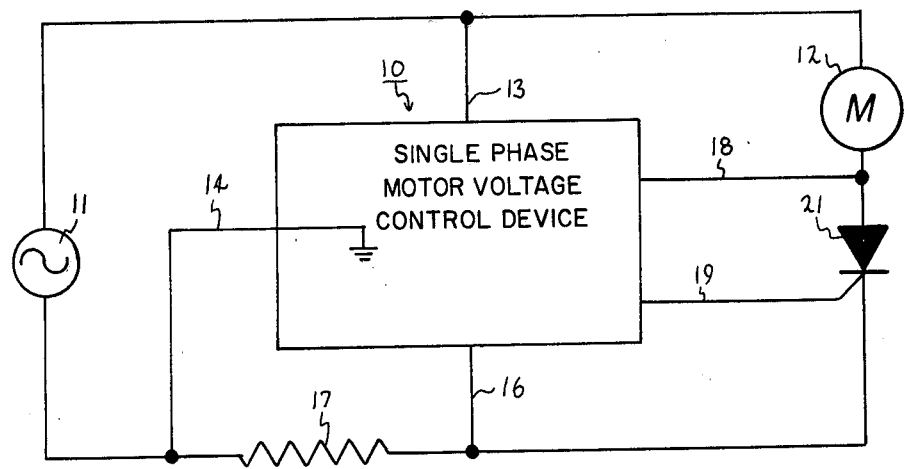
FIG. 3 is a schematic diagram depicting the signle-phase embodiment of the device in block diagram form in an appropriate motor circuit.

Referring now to the drawings, and in particular to FIG. 3, the single-phase embodiment of the motor voltage control device will now be described. A block representing the device is depicted generally by the numeral 10 and connects between an AC power source (11) and a single-phase motor (12). The device (10) has a voltage sense input (13) connected to one side of the power source (11), and a ground input (14) connected to the opposite side of the power source (11). The device (10) also has a current sense input (16) connected across a small resistance, such as a 0.012 ohm resistor (17), and a fail detect sense input (18) connected to one side of the motor (12). Finally, the device (10) includes a trigger output (19) for connection to the gate of a power triac (21) that controls the flow of current through the motor (12).

Figure 4:
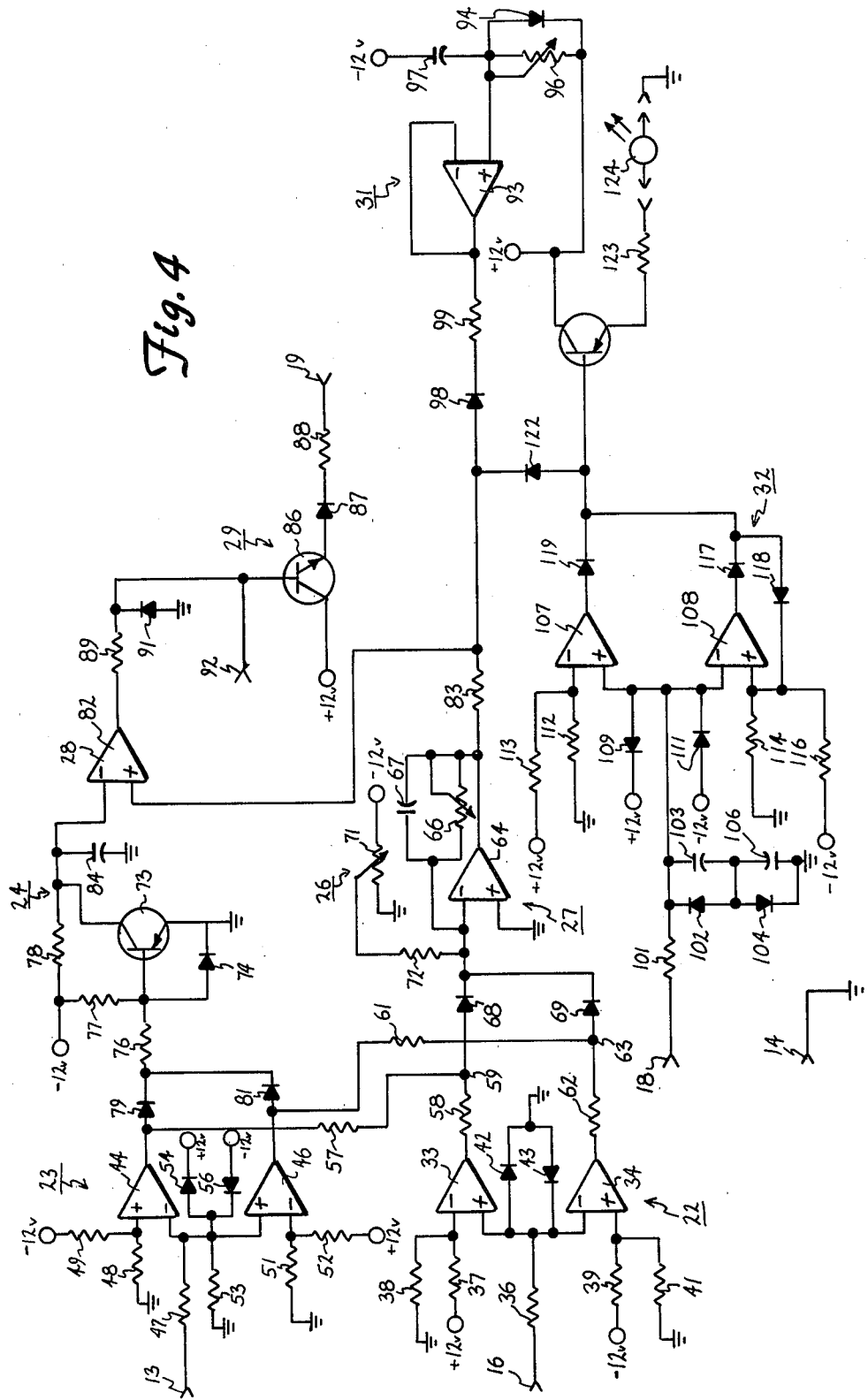
FIG. 4 is a schematic diagram of the single-phase embodiment of the device.

With reference now to FIG. 4, the single-phase device (10) includes generally a current sense unit (22), a voltage sense unit (23), a saw-tooth signal unit (24), a set point control (26), a feedback error voltage unit (27), a comparator unit (28) and a trigger unit (29). The device (10) may also include a soft start unit (31) and a fail detect unit (32). These elements will now be described with more particularity.

The current sense unit (22) includes two operational amplifiers (33 and 34) and five resistors (36, 37, 38, 39 and 41). The current sense input (16) described above connects through a 30 K ohm input resistor (36) to the noninverting input of one operational amplifier (33) and to the inverting input of the second operational amplifier (34). The remaining input to the first operational amplifier (33) connects through a 220 K ohm resistor (37) to a positive 12 volt source and through a 220 ohm resistor (38) to ground. Similarly, the remaining input of the second operational amplifier (34) connects through a 220 K ohm resistor (39) to a negative 12 volt source and through a 220 ohm resistor (41) to ground.

To protect against possible damaging transient signals from the power circuit, the current sense input resistor (36) may be grounded through a pair of parallel-connected back-to-back diodes (42 and 43). Diodes such as the IN4148 suffice well for this purpose. (Unless otherwise specified herein all diodes referred to in this description may be provided by use of part No. IN4148.) (It may also be noted at this time that all ground symbols depicted in FIG. 4 and all references to ground in this description of the single-phase embodiment refer to the logic ground connection made to one side of the AC power source (11), and therefore does not refer to a true ground potential.)

The voltage sense unit (23) also includes two operational amplifiers (44 and 46) and five resistors (47, 48, 49, 51 and 52). The voltage sense input (13) described above connects through a 220 K ohm input resistor (47) to the inverting input of one operational amplifier (44) and to the noninverting input of the second operational amplifier (46). The remaining input of the first operational amplifier (44) connects to ground through a 10 K ohm resistor (48) and to a negative 12 volt source through a 220 K ohm resistor (49). Similarly, the remaining input of the second operational amplifier (46) connects to ground through a 10 K ohm resistor (51) and to a positive 12 volt source through a 220 K ohm resistor (52).

Again to protect against possible transient signals from the power circuit, the voltage sense input resistor (47) may be further connected to a grounded 12 K ohm resistor (53) and to the anode side of a positive 12 volt biased diode (54) and to the cathode side of a negative 12 volt biased diode (56).

The outputs from the first operational amplifier (44 and 33) of both the voltage sense unit (23) and the current sense unit (22) each connect through 120 K ohm resistors (57 and 58) to form a summation node (59). In a like manner, the outputs from the two remaining operational amplifiers (46 and 34) of the voltage sense unit (23) and the current sense unit (22) each connect through 120 K ohm resistors (61 and 62) to form a second summation node (63).

The feedback error voltage unit (27) has one operational amplifier (64), one variable resistor (66) and one capacitor (67). The first and second summation nodes (59 and 63) each connect through diodes (68 and 69) to the inverting input of the operational amplifier (64), the noninverting input thereof being grounded. A 1 M ohm variable resistor (66) and a 1 microfarad capacitor (67) connect in parallel between the output and the inverting input of the operational amplifier (64). So configured, the operational amplifier (64) acts as an integrator.

A set point control unit (26) also connects to the feedback error voltage unit (27). The set point control unit (26) consists of a 50 K ohm variable resistor (71) biased between ground and a negative 12 volt source. The variable leg of this resistor (71) connects through a 62 K ohm resistor (72) to the inverting input of the feedback error voltage unit operational amplifier (64), such that the steady state voltage applied to this input may be selectively varied by control of the variable resistor (71).

The saw-tooth signal unit (24) includes one transistor (73), one diode (74) and three resistors (76, 77 and 78). The outputs of the two voltage sense unit operational amplifiers (44 and 46) each pass through diodes (79 and 81) and then join to connect through a 12 K ohm resistor (76) to the base of an emitter-grounded transistor (73), provided here by part No. 2N3638A. A negative 12 volt source also connects through a 22 K ohm resistor (77) to the base and through a 220 K ohm resistor (78) to the collector-output of the transistor (73). Finally, the base connects through the anode of a diode (74) to the emitter of the transistor.

The comparator unit (28) consists of an operational amplifier (82) having its inverting input connected to the collector-output of the saw-tooth signal unit transistor (73) and its noninverting input connected through a 100 K ohm resistor (83) to the output of the feedback error voltage unit operational amplifier (64). Additionally, a 0.1 microfarad capacitor (84) may be connected between the inverting input of the comparator unit operational amplifier (82) and ground.

The trigger unit (29) includes one transistor (86), one diode (87) and one resistor (88). The output of the comparator unit operational amplifier (82) connects through a 470 ohm resistor (89) to the base of an NPN transistor (86), such as a 2N4437. The collector of this transistor (86) may be biased at positive 12 volts, and the emitter connected through a diode (87) (such as a 1N4007) and a 100 ohm resistor (88) to the gate of a power triac (21) in the power circuit (see FIG. 3). Referring back to FIG. 4, an anode-grounded diode (91) may also be connected to the base of the transistor (86). Finally, an option trigger lead (92) may be provided at the base of the transistor (86), if desired.

The basic operation of the single-phase device (10) may now be described. The voltage sense unit (23) senses the voltage in the power circuit and produces two square wave outputs related to that voltage, one output being the inverse of the other. Similarly, the current sense unit (22) senses current flowing in the power circuit and produces two square wave outputs related to that current with one output again being the inverse of the other.

These four outputs are summed at the two summation nodes (59 and 63) such that the first summation node (59) yields an output related to the sum of the current square wave and the inverse voltage square wave, and the second summation node (63) yields an output related to the sum of the voltage square wave and the inverse current square wave.

The voltage square wave outputs are also summed and applied to the saw-tooth signal unit (73) to govern the production of a saw-tooth signal cyclically dependent upon this pulse train from the voltage sense unit (22).

The signals from the two summation nodes (59 and 63) are combined with the steady state signal from the set point control (26) and introduced into the feedback error voltage unit (27) where they are integrated. The integrated signal may then be compared with the saw-tooth signal in the comparator unit (28), and at a desired coincidence of wave forms, the comparator unit (28) will issue a trigger signal that will be amplified by the trigger unit (29) and directed into the gate of the power triac or SCR (21) that controls the flow of current through the motor (12).

Under a less than full load condition, the phase difference between the voltage and current in the motor (12) will be sensed and compared with a desired state. Should error exist, reflecting either that the current lags or leads the desired phase differential, the comparator unit (28) will cause the trigger unit (29) to fire or delay firing to re-establish the non-error condition.

Depending upon the voltage supplied by the set point control (26), and further depending upon the load conditions of the motor (12), the comparator unit (28) may cyclically fire the power triac (21) from part of the time to all of the time. In this manner, the average voltage applied to the motor (12) may be adjusted to compensate for a less than full load condition.

To assist in preventing misstarts, and to provide for a controlled initiation of motor energization, the applicant has included a soft start unit (31). The soft start unit (31) includes an operational amplifier (93) that has its noninverting input connected through a parallel connected diode (94) and 1 M ohm variable resistor (96) to a positive 12 volt source and that has its inverting input connected to its output. The noninverting input also connects through a 10 microfarad capacitor (97) to a negative 12 volt source. The output also connects through a series connected diode (98) and 1 Kohm resistor (99) to the noninverting input of the comparator unit operational amplifier (82).

During start up, an induction motor will react as though fully loaded until operating speed has been reached. The soft start unit (31) forces the apparent error signal outside the range of the saw-tooth signal, and then slowly allows the error signal to move into the saw-tooth waveform. Therefore, the average power supplied to the motor (12) will increase over time during start up. This gradual application of power will prevent misstarts and encourage a smooth energization.

If the single-phase device (10) fails, and a fault develops that allows dangerous DC currents to flow in the motor (12), the motor (12) could be damaged. The applicant has therefore provided a fail detect unit (32) to guard against such an occurrence.

The fail detect unit (32) includes a sensing input (18) that connects to the power circuit through a 1 Mohm input resistor (101) and a network containing a first parallel connected diode (102) and 1 microfarad capacitor (106). The sensing input (18) also connects through the 1 Mohm input resistor (101) to the noninverting input of one operational amplifier (107) and the inverting input of another operational amplifier (108). Finally, the sensing input resistor (101) also connects to both positive and negative 12 volt sources through properly oriented diodes (109 and 111).

The inverting input of the first operational amplifier (107) connects through a 100 Kohm resistor (112) to ground and through another 100 Kohm resistor (113) to a positive 12 volt source. The noninverting input of the second operational amplifier (108) connects through a 100 Kohm resistor (114) to ground and through another 100 Kohm resistor (116) to a negative 12 volt source. The noninverting input of the second operational amplifier (108) also connects through two diodes (117 and 118) to its output. This output also connects through a diode (119) to the output of the first operational amplifier (107). Both outputs then connect to the gate of an LED trigger transistor (121), and through another diode (122) to the noninverting input of the comparator unit (28). The LED trigger transistor (121) provided here by part No. 2N4437, has its emitter connected through a 1,000 ohm resistor (123) to a grounded LED (124). The collector of the transistor (121) connects to a positive 12 volt source.

In use, the fail detect unit (32) senses the average DC voltage bias element in the motor circuit, such average DC voltage bias element being an indicium of undesirable DC current in the motor. At some preselected level, such as 1, 2 or 3 volts DC, the fail detect unit (32) becomes operational and overrides the feedback error voltage signal to lock the trigger unit (29) on while simultaneously causing the LED (124) to light and notify the operator of this condition.

Therefore, the operator may be assured that should the device (10) fail and undesirable DC currents appear in the motor, the fail detect unit (32) will respond to indicia of such DC currents in the motor and lock out the device (10) so that the motor (12) may continue operating in a normal operational mode, while alerting the operator that this condition exists.

Figure 1:
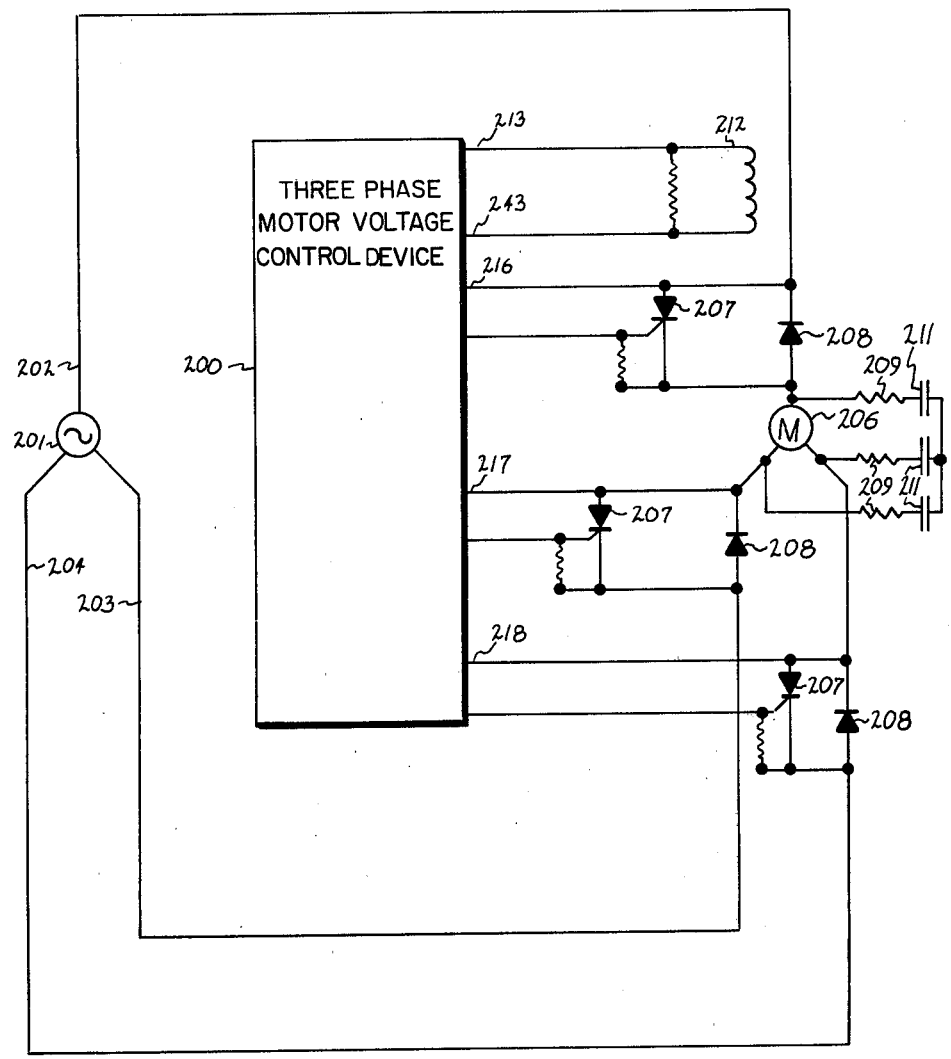
FIG. 1 is a schematic diagram depicting the three-phase embodiment of the device in block diagram form in an appropriate motor circuit.

Referring now to FIG. 1, a three-phase embodiment of the device will now be described. A block representing the device is depicted generally by the numeral 200.

Generally, three-phase electrical systems include a three-phase power source (201) having three output leads commonly dubbed the A phase (202), the B phase (203) and the C phase (204). Similarly, a three-phase motor (206) will generally have three input leads. Although such motors (206) will occasionally have a fourth lead for an internal ground connection between phases, such a fourth lead will usually be excluded. Unfortunately, the prior art only teaches the use of a motor voltage control unit to improve operating efficiency at less than fully loaded conditions with motors having such a fourth lead. This embodiment explicitly addresses the problems normally associated with a motor (206) that does not have such a fourth lead.

Briefly summarized, the three-phase device (200) will sense current in one phase (in this example the A phase (202)) and will sense voltages in all three phases. These signals will be processed to produce a feedback error voltage signal such that an SCR or triac network (207) for each phase may be selectively triggered to control the voltage for each such phase.

One important difference between a three-phase and single-phase application may be preliminarily noted at this point. In this embodiment, each phase in the power circuit has a reverse biased diode (208) placed in parallel with the triac or SCR. Therefore, even with the SCR or triac (207) turned off, currents may still flow in the negative direction. The importance of this will be made more clear below.

The SCR network (207) for each phase also includes a wye connected snubber circuit consisting of a series connected 100 ohm resistor (209) and 0.1 microfarad capacitor (211). This snubber circuit limits the rate of the rise of voltage across the SCR (207) and thereby protects that component. FIG. 1 also discloses a current transformer (212) used to sense current in the A phase (202) of the motor circuit, and this transformer (212) forms the current sense input (213) for the three-phase device (200). It should also be observed that no ground connection exists between the three-phase device (200) and the power circuit, as the power circuit has no externally accessible ground. Finally, for certain applications it may be desirable to use heat sinks or other means known in the art to maintain the SCR or triac network (207) within certain temperature limits.

Figure 2A:
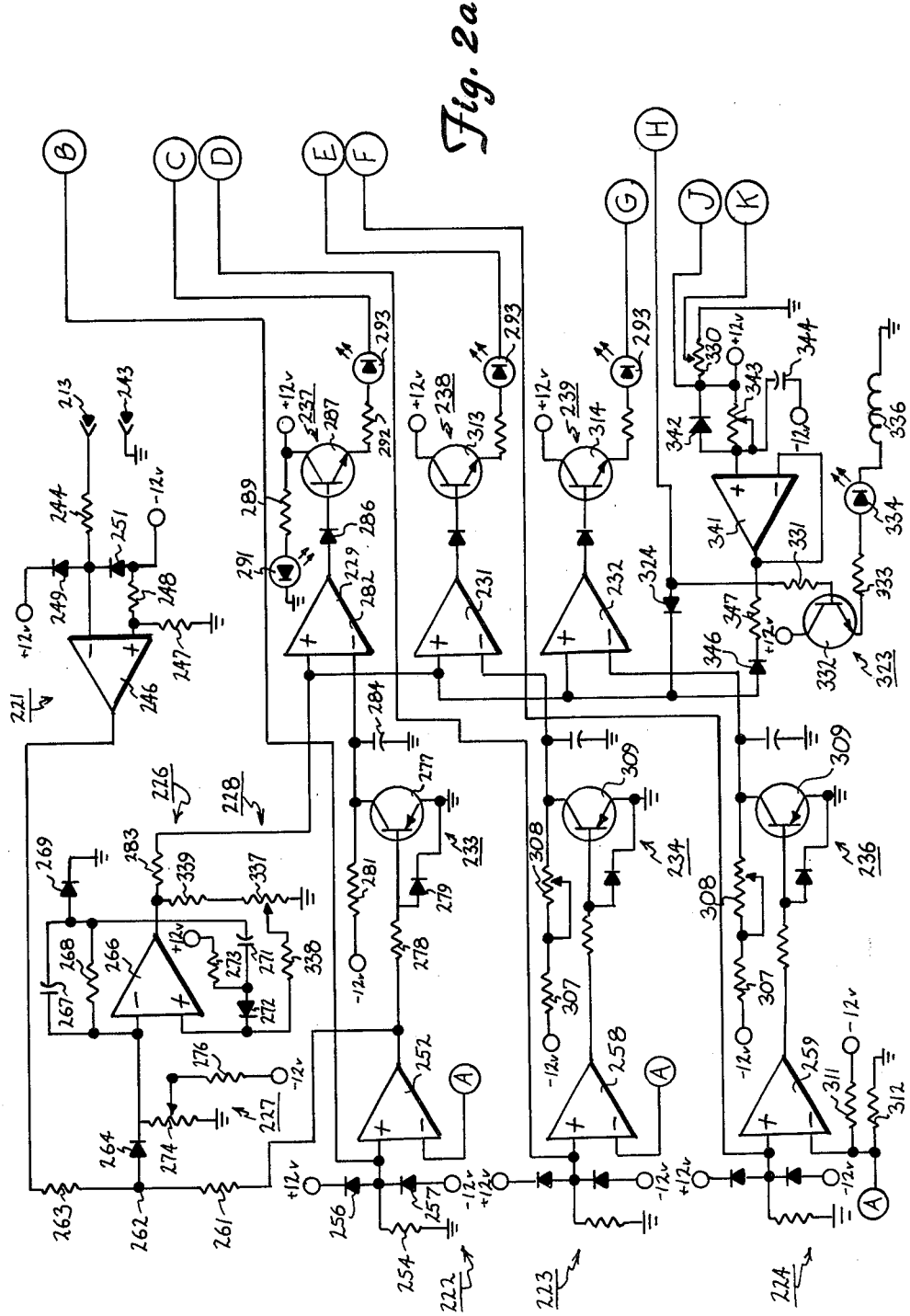
FIGS. 2a and b are schematic diagrams of the three-phase embodiment of the device.
Figure 2B:
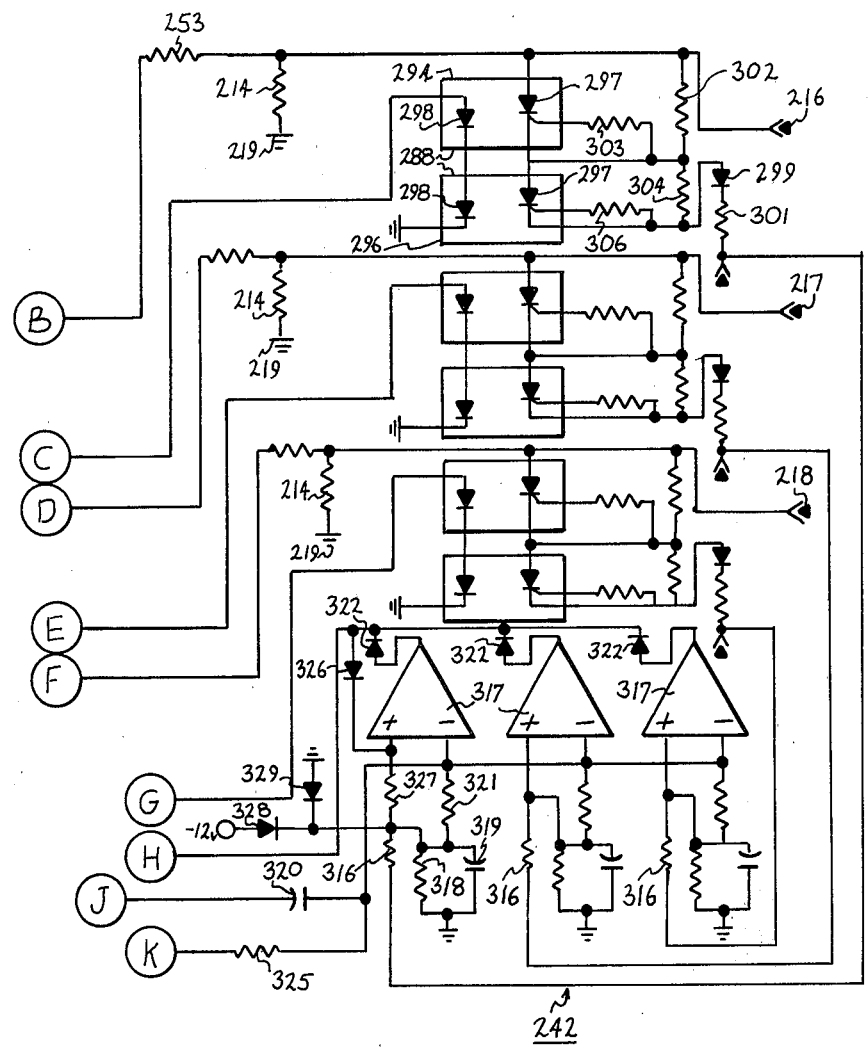

Referring now to FIGS. 2a and 2b, it may be appreciated that although the power circuit provides no ground, the logic circuitry for the three-phase device (200) requires a ground. Therefore, a logic ground may be provided by connecting a 100 Kohm ½ watt resistor (214) between each phase input (216, 217 and 218) and a common node (219). All other internal ground connections in the three-phase device (200) are connected to this common node (219) as well, and this node (219) forms the logic ground for the device (200).

With continued reference to FIGS. 2a and 2b, the three-phase device (200) includes generally a current sense unit (221), an A phase voltage sense unit (222), a B phase voltage sense unit (223), a C phase voltage sense unit (224), a sensitivity control (228), a comparator unit for each of the three-phases, (229, 231 and 232), a sawtooth signal unit for each of the three phases (233, 234 and 236) and a triggering unit for each of the three phases (237, 238 and 239). The device (200) may also include a soft start unit (241) and a fail detect unit (242). These elements will now be described with more particularity.

The current sense unit (221) has two input leads (213 and 243). One lead (243) connects to logic ground and the remaining lead (213) connects through a 30 Kohm resistor (244) to the inverting input of an operational amplifier (246). The noninverting input of this operational amplifier (246) connects through a 220 ohm resistor (247) to logic ground and through a 220 Kohm resistor (248) to a negative 12 volt source. The inverting input also connects by one diode (249) to a positive 12 volt source and by a second diode (251) to a negative 12 volt source.

The A phase voltage sense unit (222) has an operational amplifier (252) with a noninverting input connected to the A phase power line (202) through a 470 Kohm resistor (253), to logic ground through a 12 Kohm resistor (254) and to positive and negative 12 volt sources through appropriate diodes (256 and 257). The inverting input to this operational amplifier (252) connects to the inverting input of the B phase and C phase voltage sense unit's operational amplifiers (258 and 259).

The output of this operational amplifier (252) connects through a 120 Kohm resistor (261) to a summation node (262). The output of the current sense unit operational amplifier (246) also connects to this summation node (262) through a 120 Kohm resistor (263). The summation node (262) connects through a diode (264) to the inverting input of a feedback error voltage unit operational amplifier (266).

This operational amplifier (266) has a parallel connected 5 microfarad capacitor (267) and resistor (268) connected between its inverting input and its output. In addition, one side of this parallel combination connects to ground through a diode (269). The output of this operational amplifier (266) connects to its noninverting input through a 1 microfarad capacitor (271) and a diode (272). In addition, a positive 12 volt biased 1 Mohm resistor (273) connects at the junction point between the capacitor (271) and the diode (272).

A set point control (227) consisting of a 50 Kohm variable resistor (274) connected between the inverting input of this operational amplifier (266) and logic ground has its variable lead connected through a 62 Kohm resistor (276) to a negative 12 volt supply.

A saw-tooth signal unit (233) for the A phase has a PNP transistor (277) such as the 2N3638A connected by its base through a 12 Kohm resistor (278) to the output of the A phase voltage sense unit (222). The emitter of the transistor (277) connects to logic ground and also through a diode (279) to its base. Its collector is biased through a 180 Kohm resistor (281) by a negative 12 volt source.

The A phase comparator unit (229) includes an operational amplifier (282) having a noninverting input connected to the output of the feedback error voltage unit (226) by a 100 Kohm resistor (283) and an inverting input connected to the collector output of the saw-tooth signal unit transistor (277) and to logic ground through a 0.1 microfarad capacitor (284).

The output of the A phase comparator unit (229) connects through a diode (286) to the A phase trigger unit (237). This trigger unit (237) includes a trigger transistor (287) and an optical isolator network (288). The collector of the trigger transistor (287) connects to a positive 12 volt source and through a series connected 470 ohm resistor (289) and pilot light LED (291) to logic ground. The emitter connects through a series connected 100 ohm resistor (292) and trigger indicator LED (293) to the input of the A phase optical isolator network (288).

The A phase optical isolator network (288) includes two SCR-LED blocks (294 and 296). Each block (294 and 296) contains a light sensitive SCR (297) and (298) that connects to the trigger transistor (287). Light from the LED (298) will cause the SCR (297) to trigger on when the LED (298) is on. The LED's (298) in each block (294 and 296) are serially connected between the output of the trigger transistor (287) and logic ground.

The SCR's (297) in the two blocks (294 and 296) are joined such that the anode of one connects to the A phase power line (202) and its cathode connects to the anode of the remaining SCR (297). The cathode of the remaining SCR (297) then connects through a serially connected diode (299) and 43 ohm resistor (301) to the gate of the power SCR (207) shown in FIG. 1.

In addition, the anode of the first light sensitive SCR (297) connects to its cathode by a 100 Kohm resistor (302), and the gate connects to the cathode by a 6.8 Kohm resistor (303). Similarly, the anode of the second light sensitive SCR (297) connects to the cathode of that same SCR by a 100 Kohm resistor (304), and the gate connects to the cathode by a 6.8 Kohm resistor.

So connected, it may be appreciated that the optical isolator network (288) electrically separates the power circuit from the remainder of the trigger unit (237), thereby reducing the risk of damaging the three-phase device (200) by the introduction of transient signals from the power circuit.

The B and C phase voltage sense units (223 and 224), saw-tooth signal units (234 and 236), comparator units (231 and 232), and trigger units (238 and 239) are identical to their A phase counterparts and are identically connected with the following exceptions. The B and C phase voltage sense units (223 and 224) are not directly connected to the feedback error voltage unit (226) and the B and C phase saw-tooth signal units (234 and 236) each have a serially connected 160 Kohm resistor (307) and 50 Kohm variable resistor (308) between the collector of the saw-tooth signal unit transistor (308) and the negative 12 volt source, instead of a single 180 Kohm resistor (281) as used in the A phase saw-tooth signal unit (233).

Furthermore, the inverting inputs of the voltage sense unit (224) also connect to a negative 12 volt source through a 220 Kohm resistor (311), and to logic ground through another 220 Kohm resistor (312). Finally, the collectors of the trigger transistors (313 and 314) in the B and C phase trigger units (238 and 239) connect only to a positive 12 volt source, and not to a pilot light LED (291) as well.

The basic operation of the three-phase device (200) may now be described. The current sense unit (221) senses current in the A phase (202) only during the current negative half-cycle in that phase. It may be noted that single phase devices of this type sense current during both the positive and negative half-cycle. The importance of this difference will be made more clear below.

The voltage sense units (222, 223 and 224) for all three phases (202, 203 and 204) detect voltages flowing in each phase only during the voltage positive half-cycle in that phase. The positive half-cycle for the A phase voltage information combines with the negative half-cycle A phase current information at the feedback error voltage signal unit (226) to yield an error signal used thereafter by the comparator units (229, 231 and 232).

The comparator units (229, 231 and 232) then compare the error signal with the saw-tooth signal produced for each phase. Each saw-tooth signal is dependent upon the positive half-cycle voltage in that phase for its distinguishing characteristics. At the desired coincidence of wave forms, the comparator units (229, 231 and 232) will cause the trigger transistors (287, 313 and 314) to energize the LED's (298) in the optical isolator units (288). This in turn will switch on the light sensitive SCR (297) and this will enable the power SCR (207).

Since the error signal will be compared with voltage information for each phase, each phase may be corrected for optimum performance. Since the A phase current equals the inverse of the sum of the B and C phase currents, the A phase current alone may be used to compute the error signal for each phase, thereby avoiding the need to provide for a separate error signal for each phase.

Importantly, the three-phase device (200) will only block current that flows in the positive direction through the power SCR (207). Negative currents will always be able to flow through the reverse biased diode (208) provided in each phase line, even with the SCR (207) switched off. This constitutes a substantial difference over a single phase application or a three-phase application with a motor having an accessible internal ground. Without such a return path for negative currents, a three-lead motor connected to such a motor voltage control unit may experience difficult operation or fail as negative flowing currents seek a path.

Although the three-phase device (200) may also include a fail detect unit (242), that unit (242) must operate differently than a single phase device fail detect unit. In the single phase unit, voltage control is achieved by symmetrical voltage chopping; that is, an equal segment will be removed from both the positive and negative half-cycle of the voltage wave form. Because of that, there will be negligible DC currents normally flowing in the motor (206). In this three-phase unit (200), however, voltage chopping occurs only in the positive cycle and DC voltages may be present in the motor (206). Since symmetrically applied, however, there will not be any harmful DC currents flowing in the motor (206). Therefore, simple monitoring for the presence of DC voltage will not provide satisfactory protection.

In the three-phase fail detect unit (242) each phase line in the power circuit connects through a resistor (316) to the noninverting input of an operational amplifier (317) (each phase has a separate operational amplifier). Each phase also connects through a low pass filter having a parallel connected 47 Kohm resistor (318) and 1 microfarad grounded capacitor (319), and then through a 220 Kohm resistor (321) to the inverting input of the same related operational amplifier (317). The output of each operational amplifier (317) connects through a diode (322) to an alarm signal indicator unit (323) and also through another diode (324) to the noninverting input of the comparator unit operational amplifiers (229, 231 and 232).

In addition, a diode (326) connects the output of the A phase fail detect operational amplifier (317) to its noninverting input, and the noninverting input of the A phase operational amplifier (317) further connects through a 10 K ohm resistor (327) to a diode (328) having its anode connected to a negative 12 volt source, and another diode (329) having its anode connected to logic ground.

Finally, the inverting inputs of the fail detect operational amplifiers (317) connect to a positive 12 volt source through a 0.1 microfarad capacitor (320). These inverting inputs also connect through a 1 M ohm resistor (325) to the variable leg of a variable resistor (330) that has one end tied to logic ground and the remaining end connected to a positive 12 volt source.

The operation of the fail detect unit (242) may now be explained. The low pass filters pass an approximate DC signal to the operational amplifiers (317). These signals are then averaged with the positive signals passing through the forward biased diodes (322). Should a DC imbalance occur between any of the three phases, the operational amplifiers (317) will provide a signal to the comparator units (229, 231 and 232) that will lock the trigger units (237, 238 and 239) on.

As noted above, the outputs of these fail detect unit operational amplifiers (317) also connect through a 10 K ohm resistor (331) to the base of an NPN transistor (332) (such as the 2N4437) having its collector attached to a positive twelve volt source and its emitter connected to logic ground through a series connected 1 K ohm resistor (333), an LED (334) and a relay (336). The LED (334) provides a signal to the operator that the motor (206) has been locked on, and that the device is not operating properly. The relay (336) provides the operator with a means for adding additional alarm devices, such as audible alarm units (not shown).

The applicant has also provided the three-phase device (200) with a sensitivity control (228) for the feedback error voltage unit (226). This sensitivity control (228) consists of a 10 K ohm variable resistor (337) having its variable lead connected to the noninverting input of the feedback error voltage unit operational amplifier (266) through a resistor (338) and its primary lead connected to the output of that operational amplifier (266) through a 100 K ohm resistor (339). By providing this sensitivity control (228), the operator may adjust the device (200) to operate within a pre-selected phase angle range, instead of requiring a pre-selected phase angle point. By varying this control, the operator may widen or narrow the range of allowable phase angles, depending upon the intended application.

To assist in preventing misstarts, and to provide for a controlled initiation of motor energization, the applicant has included a soft start unit (241). The soft start unit (241) includes an operational amplifier (341) that has its output connected to its inverting input and that has its noninverting input connected through a parallel connected diode (342) and 1 M ohm variable resistor (343) to a positive 12 volt source. The noninverting input also connects through a 10 microfarad capacitor (344) to a negative 12 volt source. Finally, the output of the operational amplifier connects through a series connected diode (346) and 1 K ohm resistor (347) to the noninverting inputs of the comparator unit operational amplifiers (282, 231 and 232).

During start up, an induction motor (206) will react as though fully loaded until operating speed has been reached. The soft start unit (241) forces the apparent error signal outside the range of the saw-tooth signal, and then slowly allows the error signal to move into the saw-tooth waveform. Therefore, the average power supplied to the motor (206) will increase over time during start up. This gradual application of power will prevent misstarts and encourage a smooth energization.

It may now be noted that the trigger indicator LED's (293) connected in series between the trigger transistors (287, 313 and 314) and the optical isolators (288) for each phase will light whenever the trigger transistor (287, 313 or 314) sends an enabling signal to the optical isolator units (288). Therefore, by observing the relative brightness of each trigger indicator LED (293), an operator may make a rough determination as to how severely the unit (200) is cutting the power delivered to the motor (206). Furthermore, by comparing the intensity of the LED's (293) with one another, an operator may make an estimation as to how balanced the system may be operating from phase to phase.

It should also be noted that though the three-phase device has been described as only chopping the motor voltage during the positive half-cycle of the voltage waveform, with appropriate modifications that will be evident to those skilled in the art, this device will also operate satisfactorily if the voltage chopping occurs only during the negative half-cycle of the voltage wave form.

Furthermore, it should be noted that this three-phase device will operate with either a wye connected or delta connected power source without requiring rewiring of the motor. This flexibility may not be found in the prior art.

Other alterations and improvements upon the invention disclosed herein will be evident to those skilled in the art, and are not to be considered outside the scope of the appended claims.

I claim:

1. An improvement in a motor voltage control unit suitable for use with a motor and having a voltage sense unit for sensing motor voltage, a current sense unit for sensing motor current, a feedback error voltage unit operably connected to said voltage sense unit and said current sense unit for producing a signal related to the phase difference between the motor voltage and the motor current, a saw-tooth signal unit operably connected to said voltage sense unit for producing a cyclical signal, a comparator unit operably connected to said feedback error voltage unit and said saw-tooth signal unit for comparing those signals and a trigger unit responsive to said comparator unit for connecting said disconnecting the motor voltage from the motor, the improvement comprising a soft start unit operably connected to said comparator unit for gradually increasing the motor voltage during the motor starting cycle by initially separating the signal from the feedback error voltage unit from the cyclical signal of the saw-tooth signal unit, and then gradually allowing said signals to coincide.

2. An improvement in a motor voltage controller unit suitable for use with a motor and having a voltage sense unit for sensing motor voltage, a current sense unit for sensing motor current, a feedback error voltage unit operably connected to said voltage sense unit and said current sense unit for producing a signal related to the phase difference between the motor voltage and the motor current, a saw-tooth signal unit operably connected to said voltage sense unit for producing a cyclical signal, a comparator unit operably connected to said feedback error voltage unit and said saw-tooth signal unit for comparing those signals and a trigger unit responsive to said comparator unit for connecting and disconnecting the motor voltage from the motor, the improvement comprising fail detect means responsive to indicia of DC currents in the motor and operably connected to the trigger unit for locking the trigger unit on to continually apply motor voltage to the motor when said fail detect means senses indicia of DC currents in the motor.

3. A motor voltage control device for use with three-phase motors having no easily accessible ground path between phases, the device comprising:
 (a) first, second and third voltage sense means for sensing motor voltage in the first, second and third phases, respectively;
 (b) current sense means for sensing motor current in said first phase;
 (c) feedback error voltage means operably connected to said current sense means and to said first voltage sense means for producing a signal related to the phase difference between the motor voltage and motor current in the first phase;
 (d) first, second and third saw-tooth signal means operably connected to said first, second and third voltage sense means, respectively, for producing a cyclical signal;
 (e) first, second and third comparator means operably connected to said first, second and third saw-tooth signal means, respectively, and to said feedback error voltage means, for comparing such signals; and
 (f) first, second and third trigger means responsive to said first, second and third comparator means, respectively, and operably connected to the first, second and third phases, respectively, for selectively connecting and disconnecting the motor voltage from the motor during the positive half cycle of the motor voltage, but not during the negative half cycle of the motor voltage.

4. A motor voltage control device for use with three-phase motors having no easily accessible ground path between phases, the device comprising:
 (a) first, second and third voltage sense means for sensing motor voltages in the first, second and third phases, respectively;
 (b) current sense means for sensing motor current in said first phase;
 (c) feedback error voltage means operably connected to said current sense means and to said first voltage sense means for producing a signal related to the phase difference between the motor voltage and motor current in the first phase;
 (d) first, second and third saw-tooth signal means operably connected to said first, second and third voltage sense means, respectively, for producing a cyclical signal;
 (e) first, second and third comparator means operably connected to said first, second and third saw-tooth signal means, respectively, and to said feedback error voltage means, for comparing such signals; and
 (f) first, second and third trigger means responsive to first, second and third comparator means, respectively, and operably connected to the first, second and third phases, respectively, for selectively connecting and disconnecting the motor voltage from the motor; and
 (g) first, second and third return path means operably connected to the first, second and third phases, respectively, for providing a path for motor current at all times during the negative half cycle of the motor current.

5. A motor voltage control device for use with three-phase motors having no easily accessible ground path between phases, the device comprising:
 (a) first, second and third voltage sense means for sensing motor voltages in the first, second and third phases, respectively;
 (b) current sense means for sensing motor current in said first phase;
 (c) feedback error voltage means operably connected to said current sense means and to said first voltage sense means for producing a signal related to the phase difference between the motor voltage and motor current in the first phase;
 (d) first, second and third saw-tooth signal means operably connected to said first, second and third voltage sense means, respectively, for producing a cyclical signal;
 (e) first, second and third comparator means operably connected to said first, second and third saw-tooth signal means, respectively and to said feedback error voltage means, for comparing such signals; and
 (f) first, second and third trigger means responsive to said first, second and third comparator means, respectively, and operably connected to the first, second and third phases, respectively, for selectively connecting and disconnecting the motor voltage from the motor during the positive half cycle of the motor voltage, but not during the negative half cycle of the motor voltage; and
 (g) first, second and third return path means operably connected to the first, second and third phases, respectively, for providing a path at all times for motor current during the negative half cycle of the motor current.

6. The improvement of claims 3 or 4, and further including soft start means operably connected to said first, second and third comparator means for gradually increasing the motor voltage during the motor starting cycle.

7. The improvements of claims 3 or 4, and further including fail detect means responsive to indicia of DC currents in the motor and operably connected to said first, second and third trigger means for locking said trigger units on to continually apply motor voltage to the motor when said fail detect means senses indicia of DC currents in any of said first, second and third phases.

8. The improvements of claims 3 or 4, and further including sensitivity control means operably connected to said feedback error voltage means for varying the sensitivity of said feedback error voltage means to phase differences between the current in said first phase and the voltage in said first phase.

9. A motor voltage control device for use with three-phase motors having no easily accessible ground path between phases, the device comprising:
  (a) first, second and third voltage sense means for sensing motor voltage in the first, second and third phases, respectively;
  (b) current sense means for sensing motor current in said first phase;
  (c) feedback error voltage means operably connected to said current sense means and to said first voltage sense means for producing a signal related to the phase difference between the motor voltage and motor current in the first phase;
  (d) first, second and third saw-tooth signal means operably connected to said first, second and third voltage sense means, respectively, for producing a cyclical signal;
  (e) first, second and third comparator means operably connected to said first, second and third saw-tooth signal means, respectively, and to said feedback error voltage means, for comparing such signals; and
  (f) first, second and third trigger means responsive to said first, second and third comparator means, respectively, and operably connected to the first, second and third phases, respectively, for selectively connecting and disconnecting the motor voltage from the motor during one-half cycle of the motor voltage, but not during the remaining half cycle of the motor voltage.

* * * * *